United States Patent
McClard et al.

(10) Patent No.: US 10,507,379 B2
(45) Date of Patent: Dec. 17, 2019

(54) FLOOR-BASED GAME MANAGEMENT

(71) Applicant: Intel Corporation, Santa Clara, CA (US)

(72) Inventors: Anne P. McClard, Portland, OR (US); Aimee Knier, Portland, OR (US); Aaren B. Esplin, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 484 days.

(21) Appl. No.: 15/217,699

(22) Filed: Jul. 22, 2016

(65) Prior Publication Data

US 2018/0021677 A1    Jan. 25, 2018

(51) Int. Cl.
  *A63F 13/00*  (2014.01)
  *A63F 9/24*   (2006.01)
  *A63F 13/214* (2014.01)
  *A63F 3/00*   (2006.01)

(52) U.S. Cl.
  CPC .............. *A63F 9/24* (2013.01); *A63F 13/214* (2014.09); *A63F 2003/00347* (2013.01); *A63F 2009/247* (2013.01); *A63F 2009/2442* (2013.01); *A63F 2009/2452* (2013.01); *A63F 2250/21* (2013.01)

(58) Field of Classification Search
  None
  See application file for complete search history.

(56) References Cited

U.S. PATENT DOCUMENTS

| | | | | |
|---|---|---|---|---|
| 5,717,923 A | * | 2/1998 | Dedrick | G06F 17/30702 |
| 5,839,976 A | * | 11/1998 | Darr | A63B 5/22 |
| | | | | 473/414 |
| 5,848,396 A | * | 12/1998 | Gerace | G06Q 30/02 |
| | | | | 705/7.33 |
| 8,480,091 B1 | * | 7/2013 | Florence | A63F 3/00157 |
| | | | | 273/309 |
| 2005/0048871 A1 | * | 3/2005 | Brown | A47D 15/003 |
| | | | | 446/487 |
| 2006/0281507 A1 | * | 12/2006 | Adams | A63F 3/00643 |
| | | | | 463/6 |
| 2007/0191141 A1 | * | 8/2007 | Weber | A63B 69/0026 |
| | | | | 473/446 |
| 2007/0247700 A1 | * | 10/2007 | Makowski | G09B 19/00 |
| | | | | 359/322 |
| 2008/0124509 A1 | * | 5/2008 | Boise | G06F 3/0395 |
| | | | | 428/45 |
| 2009/0156308 A1 | * | 6/2009 | Hsu | A63F 13/02 |
| | | | | 463/39 |
| 2009/0258704 A1 | * | 10/2009 | Asami | A63F 13/02 |
| | | | | 463/36 |

(Continued)

*Primary Examiner* — Paul A D'Agostino
(74) *Attorney, Agent, or Firm* — Jordan IP Law, LLC

(57) ABSTRACT

Systems and methods may provide for determining an identity of an interchangeable overlay adjacent to a detection mat of a floor-based game management apparatus and detecting foot-based user input via an array of sensors distributed across a surface of the detection mat. Additionally, game-related user feedback may be output via one or more speakers of the floor-based game management apparatus based at least in part on the foot-based user input and the identity of the interchangeable overlay. In one example, at least a portion of the game-related user feedback is output via an array of light sources distributed across the surface of the detection mat.

25 Claims, 5 Drawing Sheets

(56) References Cited

U.S. PATENT DOCUMENTS

| | | | |
|---|---|---|---|
| 2010/0246898 A1* | 9/2010 | Izumi | A63B 6/00 382/106 |
| 2010/0285882 A1* | 11/2010 | Hsu | A63F 13/28 463/37 |
| 2012/0015334 A1* | 1/2012 | Hamilton | A63B 71/0622 434/247 |

* cited by examiner

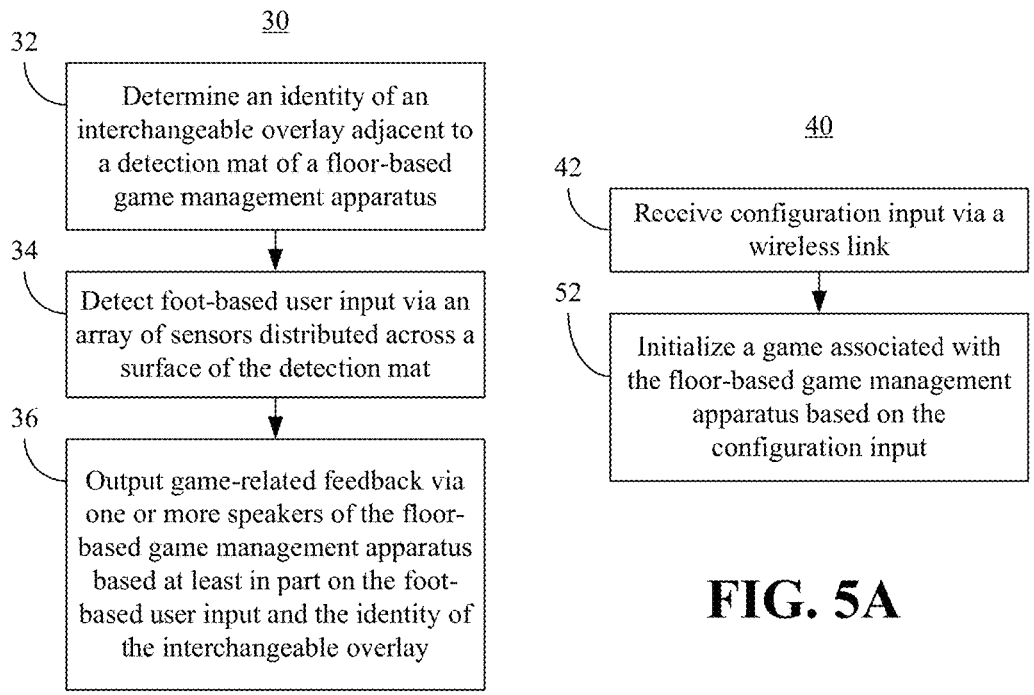
FIG. 4
FIG. 5A
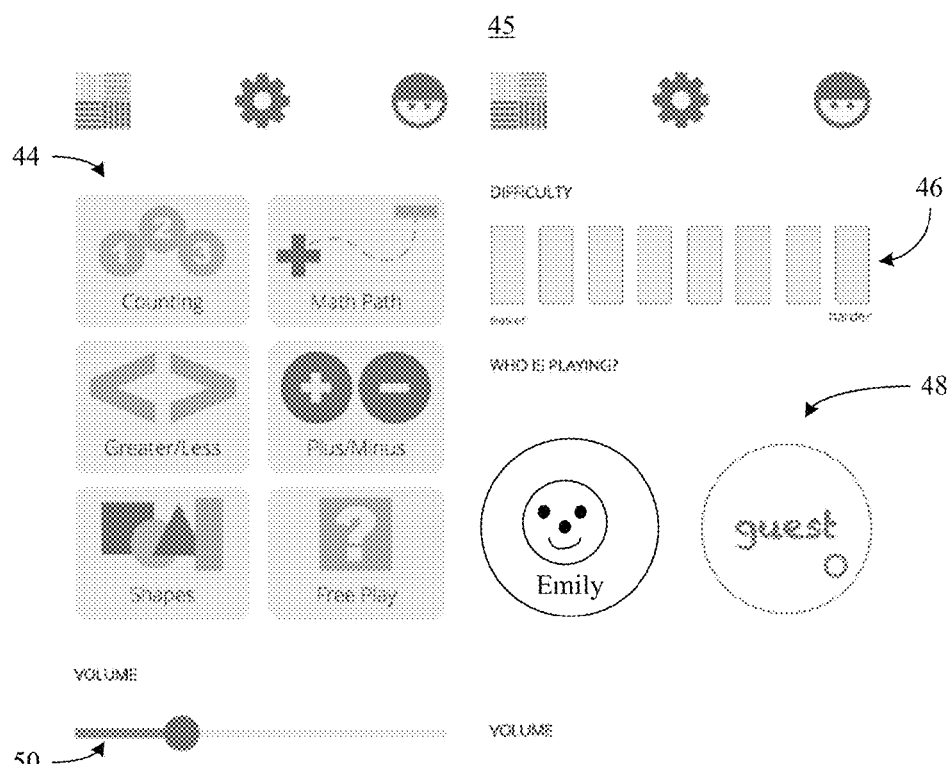
FIG. 5B

FLOOR-BASED GAME MANAGEMENT

TECHNICAL FIELD

Embodiments generally relate to interactive systems. More particularly, embodiments relate to interactive floor-based game management systems.

BACKGROUND

Interactive games may typically involve the use of a screen/display that detracts from the user experience. For example, in order to play a conventional handheld game, a user might stare at a display in a manner that leads to a primarily solo playing experience for potentially long periods of time. While movement tracking games (e.g., WII from Nintendo Co., Ltd.) may facilitate group participation, there remains considerable room for improvement. More particularly, playing movement tracking games also typically involves staring at a screen/display (e.g., flat screen monitor, display-enabled goggles) that limits face-to-face human interaction between users.

BRIEF DESCRIPTION OF THE DRAWINGS

The various advantages of the embodiments will become apparent to one skilled in the art by reading the following specification and appended claims, and by referencing the following drawings, in which:

FIG. 4 is a flowchart of an example of a method of operating a controller according to an embodiment;

FIG. 5A is a flowchart of an example of a method of configuring a floor-based game management apparatus according to an embodiment;

FIG. 5B is an illustration of an example of a user interface according to an embodiment;

DESCRIPTION OF EMBODIMENTS

Figure 1:
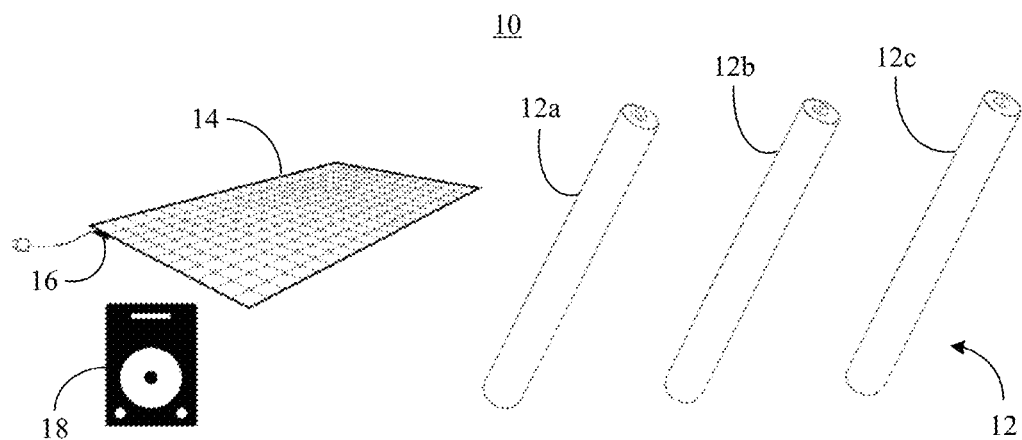
FIG. 1 is an illustration of an example of an interactive game system according to an embodiment.

Turning now to FIG. 1, an interactive game system 10 is shown in which a plurality of interchangeable overlays 12 (12a-12c, e.g., rugs/carpets/textiles) may facilitate the playing of various games in conjunction with a detection mat 14, a controller 16 and one or more speakers 18. For example, a first overlay 12a might include a first decorative pattern (not shown) that corresponds to a first set of games (e.g., one or more games relating to math and/or counting), a second overlay 12b may include a second decorative pattern (not shown) that corresponds to a second set of games (e.g., one or more games relating to music), a third overlay 12c might include a third decorative pattern (not shown) that corresponds to a third set of games (e.g., one or more games relating to entertainment/amusement), and so forth. The illustrated overlays 12 are rolled up (e.g., to facilitate stowage, packaging, transport and/or shipment).

The interactive gaming system 10 may be considered to be "screen-free" to the extent that users may enter input to the system 10 and receive feedback (e.g., game-related user instructions, messages, questions, hints, confirmations, etc.) from the system 10 during game play without the use of a display (e.g., liquid crystal display/LCD, light emitting diode/LED display, touch screen, etc.). As will be discussed in greater detail, the illustrated screen-free solution may enhance the user experience by increasing human interaction between users, as well as improve the efficiency and reduce the power consumption of the system 10 itself.

Figure 2:
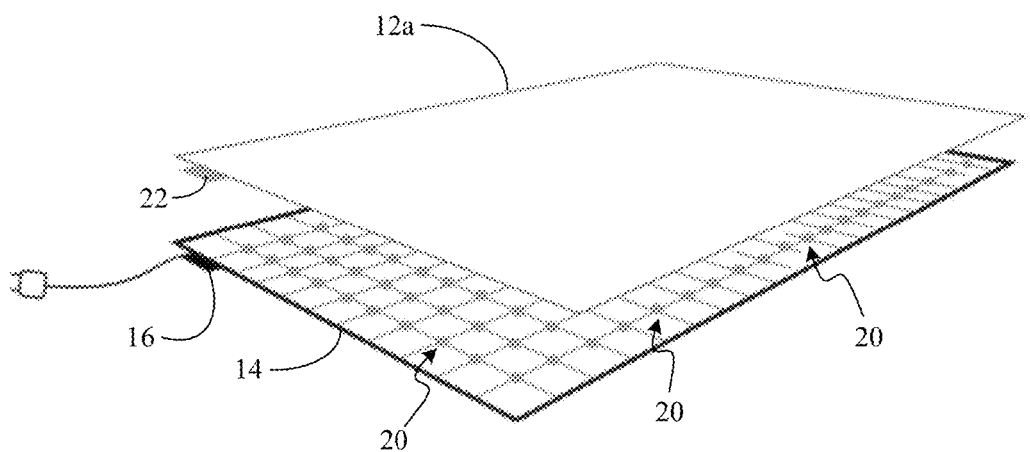
FIG. 2 is a perspective view of an example of an interchangeable overlay adjacent to a detection mat according to an embodiment.

FIG. 2 shows an enlarged perspective view of an interchangeable overlay such as, for example, the first overlay 12a, positioned adjacent to the detection mat 14. The controller 16 may generally determine the identity of the interchangeable first overlay 12a via a wireless (e.g., magnetic, Bluetooth, Radio Frequency identifier/RFID) and/or wired (e.g., Universal Serial Bus/USB) link with the first overlay 12a. For example, the first overlay 12a might include a unique magnetic signature/pattern that may be read by one or more Hall Effect sensors in the detection mat 14. In another example, the first overlay 12a may include a passive RFID tag 22 configured to transmit an identifier of the first overlay 12a, where the identifier may be linked or otherwise associated with the types of games supported by the first overlay 12a. Thus, the detection mat 14 may use the received identifier to search a game database for a list of games. Alternatively, the identifier might explicitly indicate the types of games supported by the first overlay 12a.

In the illustrated example, the detection mat 14 includes an array of sensors 20 distributed (e.g., laterally spaced) across a surface of the detection mat 14. The sensors 20 may include, for example, pressure sensors, temperature sensors, proximity sensors, acoustic sensors, etc., or any combination thereof. The sensors 20 may generally be used to capture foot-based user input before, during and/or after game play. The sensors 20 may also be used to capture input from other objects such as, for example, toys, balls and/or tokens thrown onto the first overlay 12a. Thus, pressure sensors may measure the amount of force applied at different locations of the first overlay 12a (e.g., to detect the presence or absence of a foot), temperature sensors may measure temperature differences across the first overlay 12a (e.g., to detect the presence of body heat), proximity sensors may measure (e.g., via infrared/IR or visible light reflections) the closeness of objects to the first overlay 12a, acoustic sensors (e.g., microphones) may measure sound (e.g., to detect spoken user input), and so forth. Other types of sensors may also be used to determine the state of the first overlay 12a and/or the physical surroundings of the first overlay 12a.

The detection mat 14 may use the foot-based user input and the identity of the first overlay 12a to select a game to be played and/or game-related user feedback to be provided to the user(s) during game play. For example, the decorative pattern of the first overlay 12a might include a special space (e.g., a star) that a user may step on in order to select a game. In such a case, with each foot press of the special space, the detection mat 14 may automatically sequence through a list of games associated with the identity of the first overlay 12a and announce the selected game audibly through speakers such as the one or more speakers 18 (FIG. 1) and/or visually through lights (not shown) positioned across the detection mat 14. Moreover, a separate device (e.g., mobile device) may be used to initially configure the interactive game system to support a particular game.

During game play, the foot-based user input may indicate where one or more users are standing. Accordingly, the detection mat 14 may also use the foot-based user input to determine whether users have chosen the correct locations and transition the state of the game accordingly (e.g., via sound and/or lights). Game state transitions may be implemented by retrieving game-related user feedback from the game database and controlling the speakers and/or lights to output the game-related user feedback as appropriate.

Figure 3A:
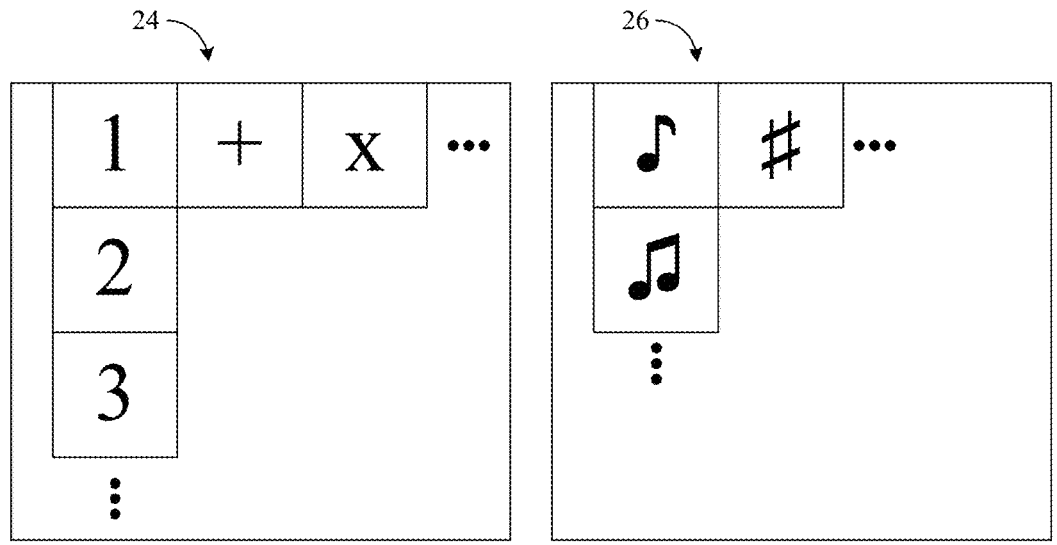
FIG. 3A is an illustration of an example of a plurality of interchangeable overlays having different decorative patterns according to embodiments.
Figure 3B:
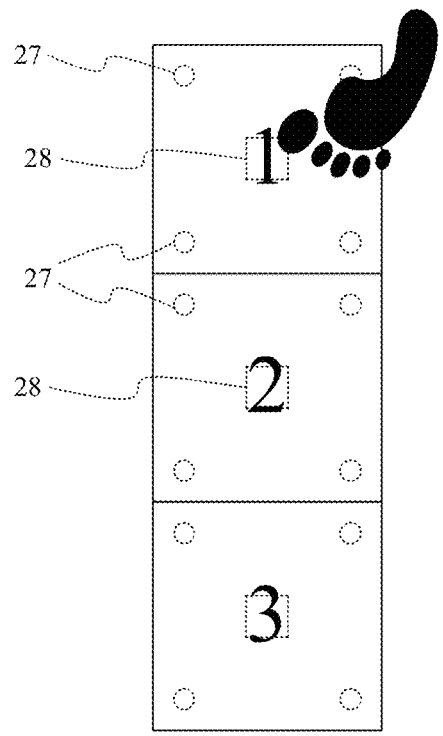
FIG. 3B is an illustration of an example of a portion of an interchangeable overlay during game play according to an embodiment.

FIG. 3A shows a first overlay 24 that includes a first decorative pattern corresponding to a first game (e.g., an educational math game) and a second overlay 26 that includes a second decorative pattern corresponding to a second game (e.g., an educational music game). The overlays 24, 26 may be readily substituted for one or more of the interchangeable overlays 12 (FIG. 1), already discussed. The particular decorative patterns are shown to facilitate discussion only and may vary depending on the circumstances (e.g., different region/cell shapes, colors and/or content). With continuing reference to FIGS. 3A and 3B, one example is shown in which sensors 27 of an adjacent detection mat (not shown) are positioned around the cells of the decorative pattern in order to determine which cell(s) are being contacted. Additionally, the adjacent detection mat may optionally include an array of light sources 28 (e.g., LEDs, translucent optical fibers) distributed across the surface of the mat in order to facilitate the generation of visible feedback (e.g., game-related user instructions) in addition to, or instead of, audible feedback.

FIG. 4 shows a method 30 of operating a controller. The method 30 may generally be implemented in a controller such as, for example, the controller 16 (FIG. 1), already discussed. More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 32 may provide for determining an identity of an interchangeable overlay adjacent to a detection mat of a floor-based game management apparatus. Block 32 may therefore include the exchange of one or more wireless and/or wired signals with the interchangeable overlay. Block 34 may detect foot-based user input via an array of sensors distributed across a surface of the detection mat. As already noted, the foot-based user input may be detected by pressure sensors, temperature sensors, proximity sensors, acoustic sensors, etc., or any combination thereof. Additionally, block 34 may include detecting contact between the detection mat and other objects such as, for example, toys, balls and/or tokens. Illustrated block 36 outputs game-related user feedback via one or more speakers of the floor-based game management apparatus based at least in part on the foot-based user input and the identity of the interchangeable overlay.

Block 36 may also include selecting a game based on the foot-based user input and the identity of the interchangeable overlay, wherein the game-related user feedback is retrieved from a game database in accordance with the selected game and the foot-based user input. In this regard, the game database might document various instructions, message sequences and/or feedback for each game to be played on the system. Accordingly, the selected game and the foot-based user input may be used as an index/key during searches of the game database. Block 36 may also provide for outputting game-related user feedback via an array of light sources distributed across the surface of the detection mat.

FIG. 4 shows a method 40 of configuring a floor-based game management apparatus. The method 40 may generally be implemented in a controller such as, for example, the controller 16 (FIG. 1), already discussed. More particularly, the method 40 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 42 provides for receiving configuration input via a wireless link. The wireless link, which may enable communication between the floor-based game management apparatus and another device (e.g., mobile device), may be implemented via, for example, Bluetooth, RFID, etc. With continuing reference to FIGS. 5A and 5B, a user interface 45 of the other device demonstrates that the configuration input might include game selection settings 44, difficulty settings 46, user profile settings 48, volume settings 50, and so forth. Block 52 may initialize a game associated with the floor-based game management apparatus based on the configuration input. Initialization may include, for example, loading one or more game-specific settings, sequences, conditions, thresholds, etc., into system memory.

Figure 6:
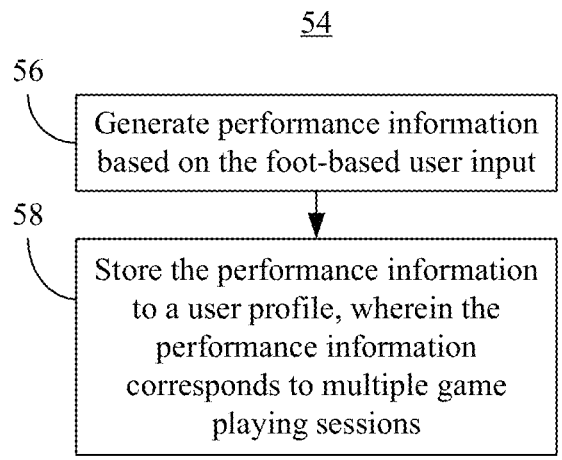
FIG. 6 is a flowchart of an example of a method of tracking user performance according to an embodiment.

FIG. 6 shows a method 54 of tracking user performance. The method 54 may generally be implemented in a controller such as, for example, the controller 16 (FIG. 1), already discussed. More particularly, the method 54 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 56 provides for generating performance information based on foot-based user input. Block 56 may therefore include, for example, tracking the number of correct entries/responses made via the interchangeable overlay and detection mat over time. The performance information may be stored to a user profile at block 58, wherein the performance information corresponds to multiple game playing sessions. Thus, the illustrated method 54 enables an interactive game system to monitor and report the progress of particular users (e.g., "Emily" in FIG. 5B) over time.

Figure 7:
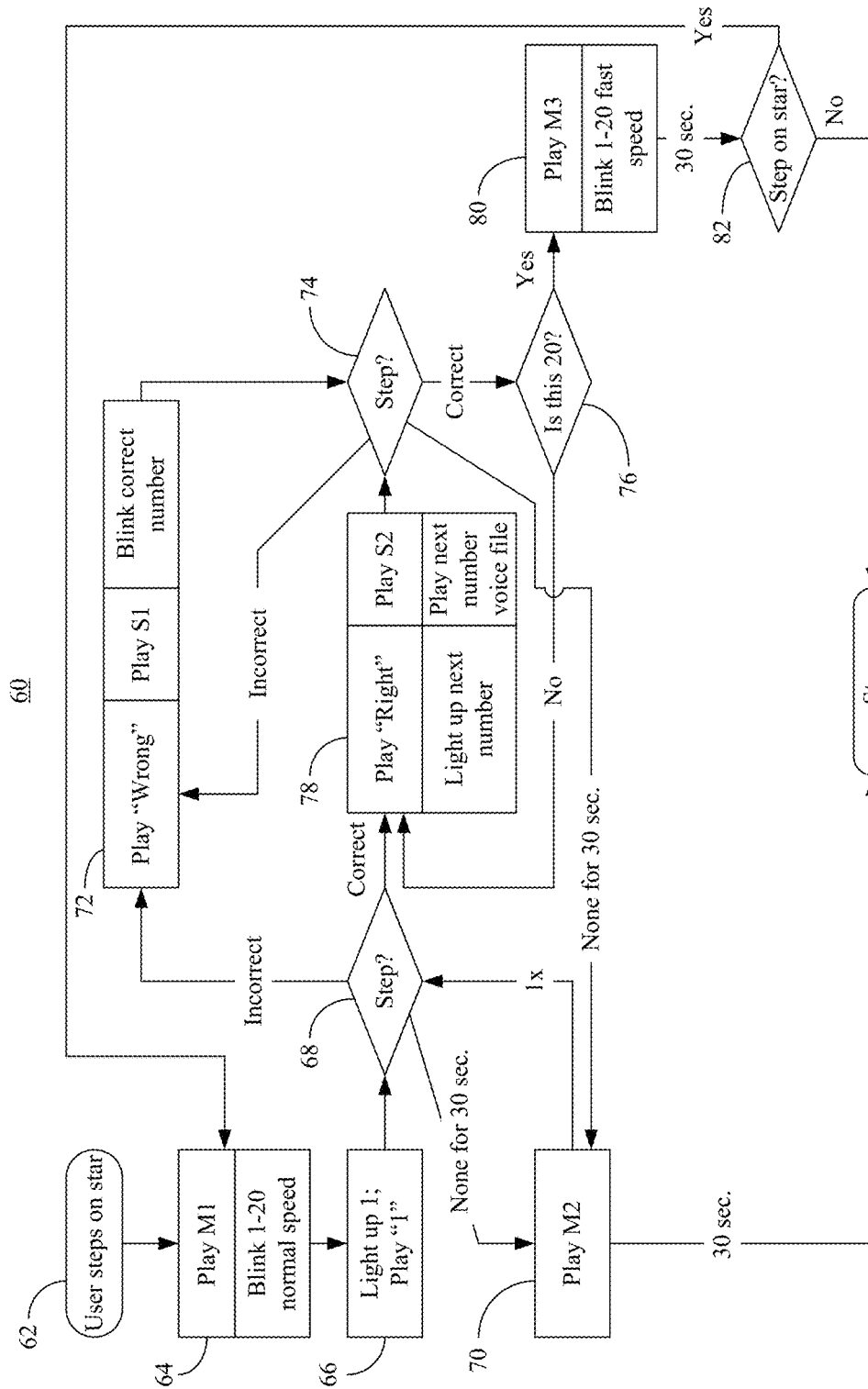
FIG. 7 is a flowchart of an example of a method of operating a floor-based game management apparatus during a number counting game according to an embodiment.

FIG. 7 shows a method 60 of operating a floor-based game management apparatus during a number counting game. The method 60 may generally be implemented in a controller such as, for example, the controller 16 (FIG. 1), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 detects that a user has stepped on a special space of an interchangeable overlay, which triggers the output of a particular message ("M1", e.g., "Let's count to 20") at combination block 64. Combination block 64 may also illuminate/blink the numbers 1-20 on the decorative pattern at a normal (e.g., moderate) speed. Illustrated block 66 provides for lighting up the number one and audibly outputting the spoken number one. A determination may be made at block 68 as to whether foot-based user input has been detected. If no foot-based user input has been detected, a particular message ("M2", e.g., "Step on the next number") may be played at block 70 and the illustrated method 60 either returns to block 68 or terminates after a certain amount of time. If incorrect foot-based user input has been detected at block 68, combination block 72 may play a particular message ("Wrong") followed by a corresponding sound ("S1", e.g., buzzer sound) and the illumination/blinking of the correct number.

A determination may be made at block 74 as to whether foot-based user input has been detected. If no foot-based user input has been detected at block 74, a particular message ("M2", e.g., "Step on the next number") may be played at block 70 and the illustrated method 60 either returns to block 68 or terminates after a certain amount of time. If incorrect foot-based user input has been detected at block 74, combination block 72 may play a particular message ("Wrong") followed by a corresponding sound ("S1", e.g., buzzer sound) and the illumination/blinking of the correct number. If correct foot-based user input has been detected at block 74, illustrated block 76 determines whether the number twenty has been reached.

If either it is determined at block 68 that correct foot-based user input has been detected or it is determined at block 76 that the number twenty has not been reached, combination block 78 plays a particular message ("Right"), plays a corresponding sound ("S2", e.g., ding sound), lights up the next number and plays the next number voice file. The method 60 may then return to block 78. If it is determined at block 76 that the number twenty has been reached, combination block 80 plays a particular message ("M3", e.g., "Yaah") and a determination may be made at block 82 as to whether the user has stepped on the special space again. If so, the illustrated method 60 returns to combination block 64. Otherwise, the method 60 may terminate. Other game control sequences may also be used depending on the circumstances.

Figure 8:
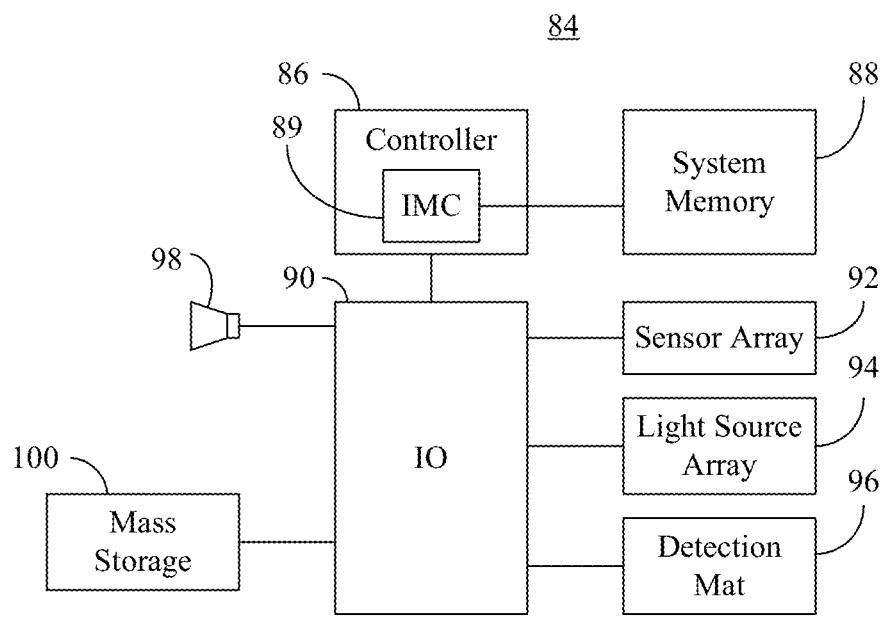
FIG. 8 is a block diagram of an example of a floor-based game management apparatus according to an embodiment.

FIG. 8 shows a floor-based game management apparatus 84. The system 84 may be readily incorporated into the interactive game system 10 (FIG. 1). In the illustrated example, a controller 86 (e.g., host processor, central processing unit/CPU) includes an integrated memory controller (IMC) 89 that communicates with system memory 88 (e.g., dynamic RAM/DRAM), which may be configured as one or more memory modules. Additionally, an input/output (IO) module 90 may be communicatively coupled to the controller 86, as well as to a sensor array 92, a light source array 94, a detection mat 96, one or more speakers 98 and mass storage 100 (e.g., non-volatile memory/NVM, flash memory, optical disk, hard disk drive/HDD, solid state disk/SSD). The controller 86 and the IO module 90 may be implemented on the same semiconductor die (not shown) as a system on chip (SoC).

The sensor array 92 and the light source array 94 may be distributed across a surface of the detection mat 96. Moreover, the controller 86 may generally implement one or more aspects of the method 30 (FIG. 4), the method 40 (FIG. 5A), the method 54 (FIG. 6) and/or the method 60 (FIG. 7), already discussed. Accordingly, the controller 86 may determine an identity of an interchangeable overlay (not shown) when the interchangeable overlay is adjacent to the detection mat 96, detect foot-based user input via the sensor array 92 and output game-related user feedback via the one or more speakers 98 and/or the light source array 94 based at least in part on the foot-based user input and the identity of the interchangeable overlay. In one example, the controller 86 selects one or more games based at least in part on the foot-based user input and the identity of the interchangeable overlay.

Moreover, the controller 86 may also retrieve the game-related user feedback from a game database. In this regard, the game database may reside in the mass storage 100, the system memory 88 and/or cache memory (not shown) of the controller 86, wherein the selected game and/or the foot-based user input may be used as an index/key during searches of the game database. Additionally, the controller 86 may generate performance information (e.g., tracking correct responses and/or incorrect responses) based on the foot-based user input and store the performance information to a user profile. The performance information may correspond to multiple game playing sessions. The user profile may reside in the mass storage 100, the system memory 88 and/or cache memory (not shown) of the controller 86, etc., or any combination thereof. In one example, configuration input is received from a mobile device via a wireless link and the selected game is initialized based on the configuration input. Subsequent game interactions, however, may take place solely between the user(s) and the interchangeable overlay.

ADDITIONAL NOTES AND EXAMPLES

Example 1 may include an interactive game system comprising an interchangeable overlay including a decorative pattern that corresponds to one or more games and a floor-based game management apparatus including one or more speakers, a detection mat including an array of sensors distributed across a surface of the detection mat, wherein the array of sensors includes one or more of pressure sensors, temperature sensors, proximity sensors or acoustic sensors, and a controller communicatively coupled to the one or more speakers and the detection mat, the controller to determine an identity of the interchangeable overlay when the interchangeable overlay is adjacent to the detection mat, detect foot-based user input via the array of sensors, select one of the one or more games based at least in part on the foot-based user input, retrieve game-related user feedback from a game database, and output the game-related user feedback via the one or more speakers.

Example 2 may include the system of Example 1, wherein the floor-based game management apparatus further includes an array of light sources distributed across the surface of the detection mat, and wherein at least a portion of the game-related user feedback is to be output via the array of light sources.

Example 3 may include the system of Example 1, wherein the controller is to generate performance information based on the foot-based user input and store the performance information to a user profile, and wherein the performance information is to correspond to multiple game playing sessions.

Example 4 may include the system of any one of Examples 1 to 3, wherein the controller is to receive configuration input via a wireless link and initialize at least one of the one or more games based on the configuration input.

Example 5 may include an interactive game system comprising an interchangeable overlay including a decorative pattern that corresponds to one or more games and a floor-based game management apparatus including one or more speakers, a detection mat including an array of sensors distributed across a surface of the detection mat, and a controller communicatively coupled to the one or more speakers and the detection mat, the controller to determine an identity of the interchangeable overlay when the interchangeable overlay is adjacent to the detection mat, detect foot-based user input via the array of sensors, and output game-related user feedback via the one or more speakers based at least in part on the foot-based user input and the identity of the interchangeable overlay.

Example 6 may include the system of Example 5, wherein the floor-based game management apparatus further includes an array of light sources distributed across the surface of the detection mat, and wherein at least a portion of the game-related user feedback is to be output via the array of light sources.

Example 7 may include the system of Example 5, wherein the controller is to select one of the one or more games based at least in part on the foot-based user input.

Example 8 may include the system of Example 5, wherein the controller is to generate performance information based on the foot-based user input and store the performance information to a user profile, and wherein the performance information is to correspond to multiple game playing sessions.

Example 9 may include the system of Example 5, wherein the controller is to retrieve the game-related user feedback from a game database.

Example 10 may include the system of any one of Examples 5 to 9, wherein the controller is to receive configuration input via a wireless link and initialize at least one of the one or more games based on the configuration input.

Example 11 may include the system of any one of Examples 5 to 9, wherein the array of sensors includes one or more of pressure sensors, temperature sensors, proximity sensors or acoustic sensors.

Example 12 may include a floor-based game management apparatus comprising one or more speakers, a detection mat including an array of sensors distributed across a surface of the detection mat, and a controller communicatively coupled to the one or more speakers and the detection mat, the controller to determine an identity of an interchangeable overlay adjacent to the detection mat, detect foot-based user input via the array of sensors, and output game-related user feedback via the one or more speakers based at least in part on the foot-based user input and the identity of the interchangeable overlay.

Example 13 may include the apparatus of Example 12, further including an array of light sources distributed across the surface of the detection mat, wherein at least a portion of the game-related user feedback is to be output via the array of light sources.

Example 14 may include the apparatus of Example 12, wherein the controller is to select a game based at least in part on the foot-based user input.

Example 15 may include the apparatus of Example 12, wherein the controller is to generate performance information based on the foot-based user input and store the performance information to a user profile, and wherein the performance information is to correspond to multiple game playing sessions.

Example 16 may include the apparatus of Example 12, wherein the controller is to retrieve the game-related user feedback from a game database.

Example 17 may include the apparatus of any one of Examples 12 to 16, wherein the controller is to receive configuration input via a wireless link and initialize a game associated with the apparatus based on the configuration input.

Example 18 may include the apparatus of any one of Examples 12 to 16, wherein the array of sensors includes one or more of pressure sensors, temperature sensors, proximity sensors or acoustic sensors.

Example 19 may include a method of operating a controller, comprising determining an identity of an interchangeable overlay adjacent to a detection mat of a floor-based game management apparatus, detecting foot-based user input via an array of sensors distributed across a surface of the detection mat, and outputting game-related user feedback via one or more speakers of the floor-based game management apparatus based at least in part on the foot-based user input and the identity of the interchangeable overlay.

Example 20 may include the method of Example 19, wherein at least a portion of the game-related user feedback is output via an array of light sources distributed across the surface of the detection mat.

Example 21 may include the method of Example 19, further including selecting a game based at least in part on the foot-based user input.

Example 22 may include the method of Example 19, further including generating performance information based on the foot-based user input, and storing the performance information to a user profile, wherein the performance information corresponds to multiple game playing sessions.

Example 23 may include the method of Example 19, further including retrieving the game-related user feedback from a game database.

Example 24 may include the method of any one of Examples 19 to 23, further including receiving configuration input via a wireless link, and initializing a game associated with the floor-based game management apparatus based on the configuration input.

Example 25 may include the method of any one of Examples 19 to 23, wherein the foot-based user input is detected by one or more of pressure sensors, temperature sensors, proximity sensors or acoustic sensors.

Example 26 may include a floor-based game management apparatus comprising means for determining an identity of an interchangeable overlay adjacent to a detection mat of a floor-based game management apparatus, means for detecting foot-based user input via an array of sensors distributed across a surface of the detection mat, and means for outputting game-related user feedback via one or more speakers of the floor-based game management apparatus based at least in part on the foot-based user input and the identity of the interchangeable overlay.

Example 27 may include the apparatus of Example 26, wherein at least a portion of the game-related user feedback is to be output via an array of light sources distributed across the surface of the detection mat.

Example 28 may include the apparatus of Example 26, further including means for selecting a game based at least in part on the foot-based user input.

Example 29 may include the apparatus of Example 26, further including means for generating performance information based on the foot-based user input, and means for storing the performance information to a user profile, wherein the performance information corresponds to multiple game playing sessions.

Example 30 may include the apparatus of Example 26, further including means for retrieving the game-related user feedback from a game database.

Example 31 may include the apparatus of any one of Examples 26 to 30, further including means for receiving configuration input via a wireless link, and means for initializing a game associated with the floor-based game management apparatus based on the configuration input.

Example 32 may include the apparatus of any one of Examples 26 to 30, wherein the foot-based user input is to be detected by one or more of pressure sensors, temperature sensors, proximity sensors or acoustic sensors.

Techniques described herein may therefore provide a screen-free play system that encourages natural whole body movement that can be tailored to users of all ages. for example, for preschool children, a play rug with letters, numbers and sounds may be used. For early elementary aged children, a play rug might be developed with designs and games tailored to them for age appropriate learning and story play. The system may encourage multi-sensory learning and physical involvement, incorporating audio, light, and movement. Moreover, the system may integrate into a bedroom, nursery, or other play space, providing a decorative and functional element, that serves developmental needs of children of all ages. The system may be used by a single player, or by multiple players, depending on the overlay and games that are installed, and may involve no additional hardware to function. Games that are available with each overlay may be explicitly educational, or "just for fun." Each overlay may support many different games. Indeed, developers might use a software development kit (SDK) to create games for the system. Accordingly, the possibilities for a single rug may be limitless. The games may enable multi-sensory learning through interactive play and rewards.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
an interchangeable overlay including:
a first surface configured to face a user and receive foot-based user input, wherein the first surface includes a decorative pattern that corresponds to one or more games, and
a second surface opposite the first surface configured to removeably place the interchangeable overlay adjacent a detection mat; and
a floor-based game management apparatus including:
one or more speakers,
the detection mat, wherein the detection mat includes:
a first surface configured to removeably receive a plurality of interchangeable overlays, and
an array of sensors distributed across the first surface of the detection mat, wherein the array of sensors includes one or more of pressure sensors, temperature sensors, proximity sensors or acoustic sensors, and
a controller communicatively coupled to the one or more speakers and the detection mat, the controller to:
determine an identity of the interchangeable overlay when the interchangeable overlay is located adjacent to the detection mat, detect the foot-based user input via the array of sensors, select one of the one or more games based at least in part on the foot-based user input, retrieve game-related user feedback from a game database, and output the game-related user feedback via the one or more speakers and not via a display screen.

2. The system of claim 1, wherein the floor-based game management apparatus further includes an array of light sources distributed across the first surface of the detection mat, and wherein at least a portion of the game-related user feedback is to be output via the array of light sources.

3. The system of claim 1, wherein the controller is to generate performance information based on the foot-based user input and store the performance information to a user profile, and wherein the performance information is to correspond to multiple game playing sessions.

4. The system of claim 1, wherein the controller is to receive configuration input via a wireless link and initialize at least one of the one or more games based on the configuration input.

5. A system comprising:
an interchangeable overlay including:
a first surface configured to face a user and receive foot-based user input, wherein the first surface includes a decorative pattern that corresponds to one or more games, and
a second surface opposite the first surface configured to removeably place the interchangeable overlay adjacent a detection mat; and
a floor-based game management apparatus including:
one or more speakers,
the detection mat, wherein the detection mat includes:
a first surface configured to removeably receive a plurality of interchangeable overlays, and
an array of sensors distributed across the first surface of the detection mat, and
a controller communicatively coupled to the one or more speakers and the detection mat, the controller to:
determine an identity of the interchangeable overlay when the interchangeable overlay is located adjacent to the detection mat,
detect the foot-based user input via the array of sensors, and
output game-related user feedback via the one or more speakers and not via a display screen based at least in part on the foot-based user input and the identity of the interchangeable overlay.

6. The system of claim 5, wherein the floor-based game management apparatus further includes an array of light sources distributed across the first surface of the detection mat, and wherein at least a portion of the game-related user feedback is to be output via the array of light sources.

7. The system of claim 5, wherein the controller is to select one of the one or more games based at least in part on the foot-based user input.

8. The system of claim 5, wherein the controller is to generate performance information based on the foot-based user input and store the performance information to a user profile, and wherein the performance information is to correspond to multiple game playing sessions.

9. The system of claim 5, wherein the controller is to retrieve the game-related user feedback from a game database.

10. The system of claim 5, wherein the controller is to receive configuration input via a wireless link and initialize at least one of the one or more games based on the configuration input.

11. The system of claim 5, wherein the array of sensors includes one or more of pressure sensors, temperature sensors, proximity sensors or acoustic sensors.

12. An apparatus comprising:
one or more speakers;
a detection mat including:
a first surface configured to removeably receive a plurality of interchangeable overlays, and
an array of sensors distributed across the first surface of the detection mat; and
a controller communicatively coupled to the one or more speakers and the detection mat, the controller to:
determine an identity of an interchangeable overlay located adjacent to the detection mat, wherein the interchangeable overlay includes a first surface configured to face a user and receive foot-based user input, wherein the first surface includes a decorative pattern that corresponds to one or more games, and wherein the interchangeable overlay includes a second surface opposite the first surface configured to removeably place the interchangeable overlay adjacent the detection mat,
detect the foot-based user input via the array of sensors, and
output game-related user feedback via the one or more speakers and not via a display screen based at least in part on the foot-based user input and the identity of the interchangeable overlay.

13. The apparatus of claim 12, further including an array of light sources distributed across the first surface of the detection mat, wherein at least a portion of the game-related user feedback is to be output via the array of light sources.

14. The apparatus of claim 12, wherein the controller is to select a game based at least in part on the foot-based user input.

15. The apparatus of claim 12, wherein the controller is to generate performance information based on the foot-based user input and store the performance information to a user profile, and wherein the performance information is to correspond to multiple game playing sessions.

16. The apparatus of claim 12, wherein the controller is to retrieve the game-related user feedback from a game database.

17. The apparatus of claim 12, wherein the controller is to receive configuration input via a wireless link and initialize a game associated with the apparatus based on the configuration input.

18. The apparatus of claim 12, wherein the array of sensors includes one or more of pressure sensors, temperature sensors, proximity sensors or acoustic sensors.

19. A method comprising:
determining an identity of an interchangeable overlay located adjacent to a detection mat of a floor-based game management apparatus including a first surface configured to removeably receive a plurality of interchangeable overlays and an array of sensors distributed across the first surface of the detection mat, wherein the interchangeable overlay includes a first surface configured to face a user and receive foot-based user input, wherein the first surface includes a decorative pattern that corresponds to one or more games, and wherein the interchangeable overlay includes a second surface opposite the first surface configured to removeably place the interchangeable overlay adjacent the detection mat;

detecting the foot-based user input via an the array of sensors distributed across the first surface of the detection mat; and outputting game-related user feedback via one or more speakers of the floor-based game management apparatus and not via a display screen based at least in part on the foot-based user input and the identity of the interchangeable overlay.

20. The method of claim 19, wherein at least a portion of the game-related user feedback is output via an array of light sources distributed across the first surface of the detection mat.

21. The method of claim 19, further including selecting a game based at least in part on the foot-based user input.

22. The method of claim 19, further including:

generating performance information based on the foot-based user input; and storing the performance information to a user profile, wherein the performance information corresponds to multiple game playing sessions.

23. The method of claim 19, further including retrieving the game-related user feedback from a game database.

24. The method of claim 19, further including:

receiving configuration input via a wireless link; and initializing a game associated with the floor-based game management apparatus based on the configuration input.

25. The method of claim 19, wherein the foot-based user input is detected by one or more of pressure sensors, temperature sensors, proximity sensors or acoustic sensors.

* * * * *